Sept. 8, 1964　　　　I. F. CHURCHILL　　　　3,147,848
CONVEYOR AND TRANSFER APPARATUS
Filed March 25, 1963　　　　　　　　　　3 Sheets-Sheet 1

United States Patent Office 3,147,848
Patented Sept. 8, 1964

3,147,848
CONVEYOR AND TRANSFER APPARATUS
Ivan F. Churchill, Greenville, S.C., assignor to W. R. Grace & Co., Duncan, S.C., a corporation of Connecticut
Filed Mar. 25, 1963, Ser. No. 267,551
6 Claims. (Cl. 198—155)

This invention relates to a conveyor and transfer apparatus. In particular it relates to a conveyor equipped with a plurality of relatively deep trays used for carrying packages or other objects and means permitting removal of the object from the deep trays so that it can be transferred to another conveyor or table.

In recent years the packaging of various goods; especially foods such as meat and poultry products, fresh produce, cheese and other dairy products; by placing the goods in a container, applying a sheet of heat-shrinkable film on top of the container and contents, and heat shrinking the film to form a tight, wrinkle free cover over the container has become increasingly important. Numerous heat-shrinkable wrapping materials have been used in these processes, e.g., the polyvinylidene chloride wrapping materials sold commercially under the trademark "Cry-O-Vac," the polyvinylidene chloride wrapping materials known to the trade as sarans, rubber hydrochloride material sold commercially under the trademark "Pliofilm"; and the recently developed irradiated biaxially oriented polyolefin films such as those described in Baird et al.—U.S. Patent 3,022,543 (Feb. 27, 1962). Usually the wrapping material is shrunk over the product container by feeding the package through a heating means such as a hot air tunnel or the like.

The use of various rigid or semi-rigid plastics such as rigid polystyrene, rigid polyvinyl chloride and the like to form the product container has become increasingly popular. However, in the shrink packaging field, use of such containers has been curtailed because of the fact that the heat required to shrink the applied film cover is frequently so high that the plastic container is damaged or degraded thereby.

In recently designed apparatus, shrink cover packaging methods using plastic containers are performed by placing the individual packages in one of a plurality of close fitting, relatively deep, carrying trays which are in turn fixed on an endless conveyor that conveys the trays through the heating means, thence to a take-off station, then back again to the feed station. Use of the carrying trays assures that each of the individual packages is properly oriented and follows a path through the heating means substantially identical to all other packages, thus assuring substantially identical heat treatment if other conditions are unchanged. The trays also serve to protect the packages, and particularly the plastic containers, from mechanical or physical damage during passage through the heating means. However, since the carrying trays have relatively high, steep sides and closely hug the plastic container package therein, it is virtually impossible to remove the final package from the tray by simple sliding. As a result, provision must be made for manual or mechanical lifting and carrying operations in order to transfer the tray contents to another conveyor or to a holding area such as a table.

It is an object of this invention to provide means for avoiding the abovedescribed problems.

Another object of the invention is to provide a conveyor system in which objects are carried in relatively deep, close-fitting carrying trays and wherein means are provided permitting removal of the objects from the trays and transfer to another conveyor or other point for further handling or storage.

A specific object of the invention is to provide a conveyor system having carrying trays with hinged bottom plates and means for raising the hinged plates at the delivery section of the conveyor. Another object is to provide a novel carrying tray construction permitting rapid attachment or detachment of the tray from a conveyor system. Still other objects of the invention will be apparent to those skilled in the art in view of the following more detailed description thereof.

The invention will be described with reference to the accompanying drawings in which.

Figure 1:
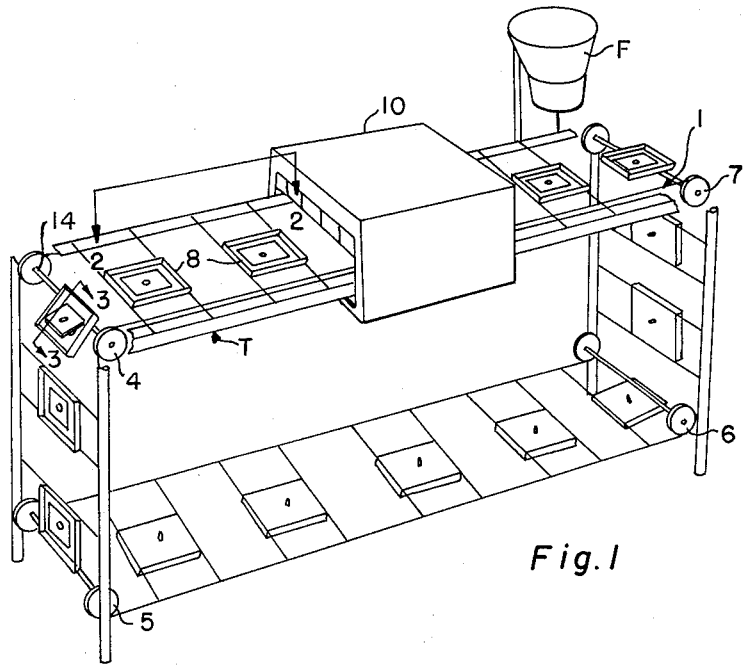
FIGURE 1 is a schematic perspective view of the conveyor system and transfer mechanism of this invention shown together with a shrink packaging heating means and other associated apparatus.
Figure 2:
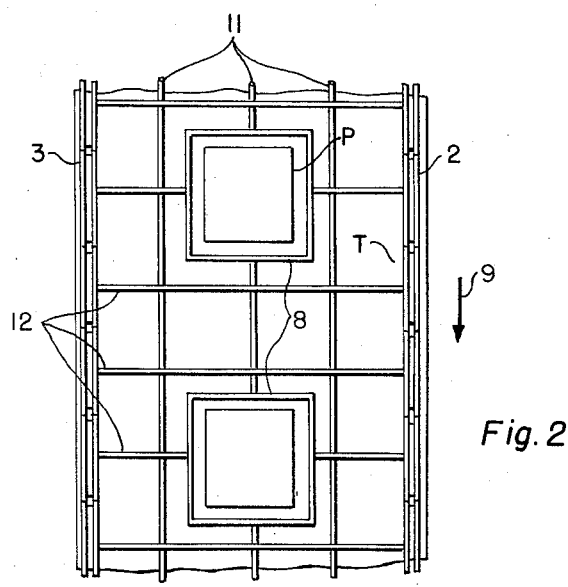
FIGURE 2 is a plan view of a portion of the conveyor drawn on an enlarged scale and taken at about the line 2—2 of FIGURE 1.

In FIGURES 1 and 2 there is shown a chain conveyor generally designated at 1 having continuous chains 2 and 3 which ride over and are driven by drive sprockets 4—4, 5—5, 6—6, and 7—7. The top portion of the conveyor is supported on a table T and is driven in a right-to-left direction as shown by the directional arrow 9 (FIGURE 2). A series of carrying trays 8 are connected to the conveyor. As each of the trays passes under funnel F a package or other object P is placed therein. In the illustrated embodiment of the invention, the conveyor then carries the trays and their contents through a heating means (such as a shrink tunnel )10. As seen in FIGURE 2 the conveyor is comprised of an open network formed of mutually perpendicular, rigidly connected, substantially stiff wire strands 11—11—11—11 12—12—12 . . . 12. The lateral strands are connected to the driven chains 2 and 3 in any suitable manner.

When the tray, together with its contents reaches the delivery end of the table the contents are sufficiently cooled by the surrounding atmosphere to be removed from the tray. One suitable means for accomplishing removal is shown as being carried on the shaft 14 connecting the sprockets 4—4 and is fully illustrated in FIGURES 3 and 4.

Figure 3:
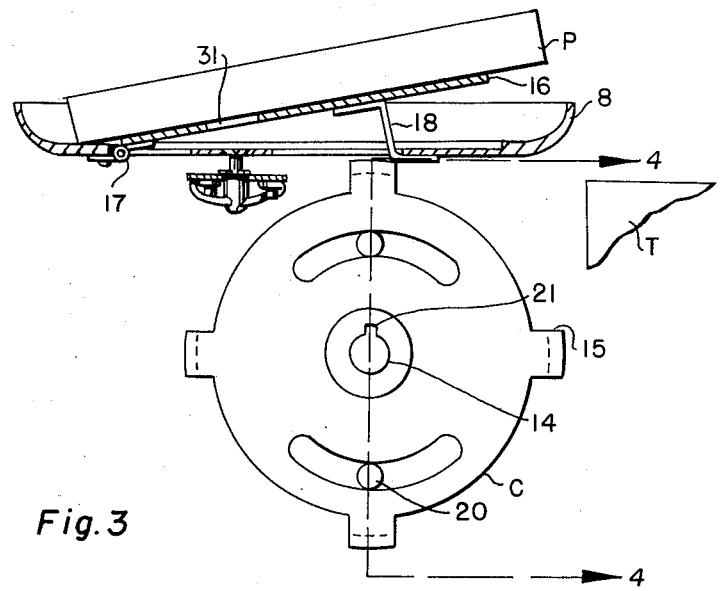
FIGURE 3 is an enlarged sectional view taken at about line 3—3 of FIGURE 1.

In FIGURE 3 it is seen that as the conveyor carries tray 8 over the end of table T one of the fingers 15 of the cam C is simultaneously rotated by shaft 14 into immediate adjacency with the bottom of the tray. A plate 16, covering a substantial portion of the tray bottom is hinged at 17 so that it can be raised above the sides of the tray. Secured to the bottom of the tray is a follower arm 18 which rides over cam finger 15 causing the tray bottom and the article (e.g. package P) which rests thereon to rise above the height of the tray sides. The article can then be easily slid off of the raised bottom portion to another conveyor or on to a storage table.

Figure 4:
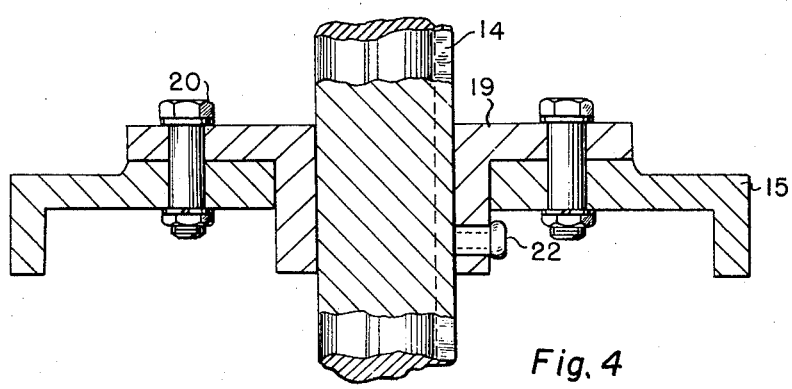
FIGURE 4 is a view in partial cross-section taken on line 4—4 of FIGURE 3.

As seen in FIGURE 4 the cam is connected to a cam hub 19 by bolts 20 or other equivalent means. The hub is slotted at 21 (see FIGURE 3) so as to receive the spline on drive shaft 14. The hub is freely slidable on the drive shaft. Set screw 22 permits suitable locking of the cam hub at the desired point on shaft 14 so as to establish the proper positional relationship between cam fingers 15 and the follower arm 18 on the bottom of the trays 8. A plurality of cams could be placed at spaced positions between the sprockets 4—4 so as to permit transfer of articles from parallel rows of trays on the conveyor. It will be understood that the distance between trays on the open-network conveyor is substantially equal to the distance between cam fingers 15 so that the hinged bottom of each tray will be lifted.

Figure 5:
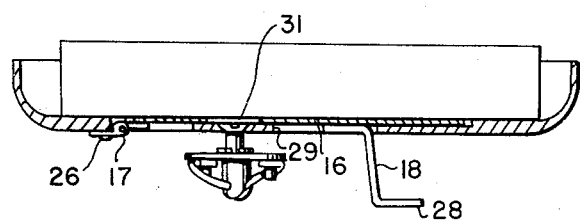
FIGURE 5 is a sectional view of a tray made in accordance with the invention.
Figure 6:
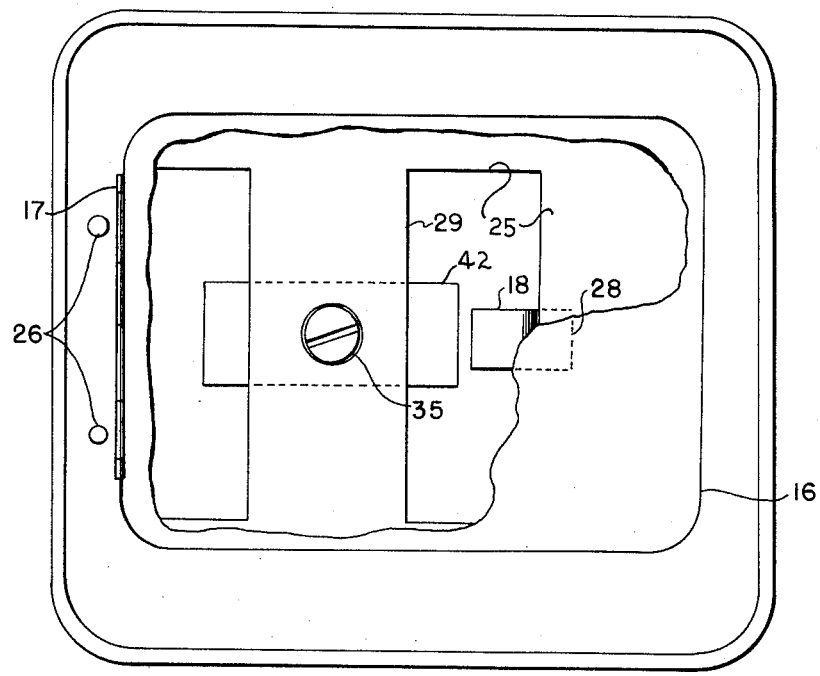
FIGURE 6 is a plan view of the tray shown in FIGURE 6, with certain portions broken away for better understanding.
Figure 7:
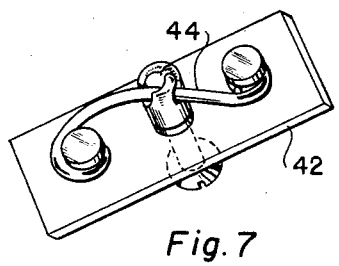
FIGURE 7 is a perspective view taken from beneath the conveyor, showing a tray holding means.

Construction of a typical tray is shown in FIGURES 5 and 6. It is seen that the tray has a hole cut through the middle portion of the bottom. The tray bottom is machined around three sides of the hole to form a shelf 25 (shown in dotted lines in FIGURE 7). At the other side of the hole a hinge 17 is attached to the tray bottom by suitable means such as rivets 26. The rivets or other equivalent attaching means should preferably be flush with the article-carrying bottom side of the tray to preclude any tearing or scratching of a container placed in the tray. To the second hinge panel there is secured (by spot welding for example) a plate 16 of sufficient size to substantially cover the hole and shelf portions of the tray bottom. The cam follower arm 18 is then welded or otherwise secured under the plate 16 at about the longitudinal center line and adjacent to the shelf 25 of the tray. As most clearly seen in FIGURES 3 and 5 the follower arm 18 is bent at its lower end to form a stop 28 which limits the distance that the hinged plate 16 can be raised.

Figure 8:
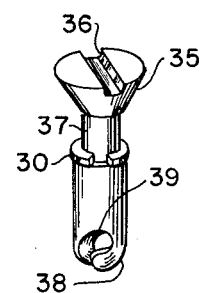
FIGURE 8 is a perspective view of the corresponding tray attaching means.

In a preferred construction permitting rapid attachment or detachment of the trays from the open network conveyor the tray shelf 25 has a laterally extending rib 29. A countersunk hole is cut through the rib at about its center, and in alignment with a hole 31 in the hinged tray plate 16. An attaching plate 42 (see FIGURES 6 and 7) is secured to the strands 12 of the conveyor. This plate has a hole therethrough, and has a retaining rod 44 permanently secured to its bottom. The tray is held to the conveyor by means of a pin 35 (see FIGURE 8) which has an enlarged head portion that will pass through hole 31 in the tray plate and rest in the countersunk hole in transverse rib 29. The pin has a relatively narrow shank 37 and a slightly larger nose 38 both of which easily pass through the holes in rib 29 and plate 42. The pin is retained on the rib by use of a lock ring 30 or other like device which is force fit over the nose and rides on the shoulder between shank 37 and nose 38. The head of the pin is grooved at 36 to permit rotation thereof with a suitable tool. The nose of the pin has a pair of bayonet slots 39. To attach a tray to the conveyor these slots are slipped over rod 44 and the pin is rotated to securely engage the pin to the rod (see FIGURE 7). The tray is consequently securely held by the head of the pin fitting in countersunk hole in the rib. Rapid detachment of the tray is accomplished by simple reverse rotation of the pin and lifting the tray and pin off of rod 44.

It is to be understood that other means, e.g., mechanically, electrically, hydraulically or pneumatically actuated push rods or fingers, operating in timed sequence with the travel of the carrying trays past the delivery section of the conveyor, could be used in lieu of the cam C with projecting fingers 15. It will also be obvious that other means of attaching the carrying trays to the conveyor could be used.

While in the foregoing specification an embodiment of the invention has been described in considerable detail for the purpose of adequately disclosing the invention, it will be appreciated that those skilled in the art may vary such details considerably without departing from the spirit and principles of the invention.

What is claimed is:
1. A heat resistant carrying tray comprising
 (a) a bottom portion having an aperture therein;
 (b) side and end walls extending upwardly from and around the periphery of said bottom portion;
 (c) a recessed shelf in the bottom portion extending around three sides of the aperture therein;
 (d) a transverse rib extending across the said aperture and integral with said shelf;
 (e) a plate hingedly connected to the tray bottom at the remaining side of the aperture and of a size to fit loosely over and cover said shelf;
 (f) a pin fitted through said plate and rib and having a head portion preventing passage through the rib;
 (g) means for holding said pin and rib together;
 (h) a nose portion on said pin extending through and beneath said rib;
 (i) means in the nose portion to detachably engage said pin and consequently the tray to an attaching rod.

2. Tray as defined in claim 1 further comprising a cam follower arm attached to the underside of said plate permitting raising of the plate to at least about the height of the tray side walls.

3. A heat resistant carrying tray comprising, in combination:
 (a) a bottom portion having an aperture therein;
 (b) side and end walls extending upwardly from and around the periphery of said bottom portion;
 (c) a recessed shelf in the bottom portion extending around three sides of the aperture therein;
 (d) a transverse rib extending across said aperture and integral with said shelf;
 (e) a plate hingedly connected to the tray bottom at the remaining side of the aperture and of a size to fit loosely over and cover said shelf; and
 (f) means for removably attaching said bottom portion to a support member.

4. A tray conveyor and transfer mechanism comprising, in combination:
 (a) an open network conveyor;
 (b) a plurality of carrying trays removably attached to said conveyor, said trays comprising
  (1) a bottom portion having an aperture therein,
  (2) side and end walls extending upwardly from and around the periphery of said bottom portion,
  (3) a recessed shelf in the bottom portion extending around three sides of the aperture therein,
  (4) a transverse rib extending across said aperture and integral with said shelf, and
  (5) a plate hingedly connected to the tray bottom at the remaining side of the aperture and adapted to fit loosely over and cover said shelf; and
 (c) means at the delivery end of said conveyor operative through the open area of said conveyor to raise the free end of the hinged plate section of each tray successively.

5. The mechanism of claim 4 wherein a cam follower arm is attached to the underside of said plate and adapted to raise the free end of the hinged plate to at least the height of the tray walls, said cam follower arm having a projection thereon cooperating with said bottom portion to limit the distance that the hinged plate is raised.

6. A tray conveyor and transfer mechanism, comprising in combination:
 (a) an open network wire frame conveyor having transverse wires;
 (b) means for driving said conveyor;
 (c) a plurality of carrying trays removably attached to said transverse wires, said trays comprising
  (1) a bottom portion having an aperture therein;
  (2) side and end walls extending upwardly from and around the periphery of said bottom portion;
  (3) a recessed shelf in the bottom portion extending around three sides of the aperture therein;
  (4) a transverse rib extending across the said aperture and integral with said shelf;

(5) a plate hingedly connected to the tray bottom at the remaining side of the aperture and of a size to fit loosely over and cover said shelf;
(6) a pin fitted through said plate and rib and having a head portion preventing passage through the rib;
(7) means for holding said pin and rib together;
(8) a nose portion on said pin extending through and beneath said rib;
(9) means in the nose portion to detachably engage said pin and consequently the tray to an attaching transverse wire,
(10) a cam follower arm attached to the underside of said plate and adapted to raise the hinged plate to at least the height of the tray walls, said cam follower arm having a projection thereon cooperating with said bottom portion to limit the distance that the hinged plate is raised;

(d) means for feeding product trays into said carrying trays,
(e) a cam having at least one finger extension and positioned at a point adjacent the bottom of said carrying trays at the delivery end of said conveyor, said finger extension cooperating with said cam follower arm to raise the hinged plate and said product tray to a height above the carrying tray walls; and
(f) product tray removal means to receive the raised product trays and thus remove them from the carraying trays.

References Cited in the file of this patent
UNITED STATES PATENTS

| | | |
|---|---|---|
| 1,991,887 | Elmer | Feb. 19, 1935 |
| 3,017,729 | Cheeley | Jan. 23, 1962 |
| 3,102,626 | Hanes | Sept. 3, 1963 |